United States Patent [19]

Keenan

[11] 3,710,243
[45] Jan. 9, 1973

[54] MICROWAVE GAGE FOR MONITORING THICKNESS OF A CONDUCTIVE WORKPIECE, FLAWS THEREIN OR DISPLACEMENT RELATIVE THERETO

[75] Inventor: Peter P. Keenan, Van Nuys, Calif.

[73] Assignee: Lockheed Aircraft Corporation, Burbank, Calif.

[22] Filed: Aug. 18, 1971

[21] Appl. No.: 172,768

[52] U.S. Cl. ............................................324/58.5 B
[51] Int. Cl. ...........................................G01r 27/04
[58] Field of Search .......324/58 R, 58 A, 58 B, 58 C, 324/58.5 R, 58.5 A, 58.5 B, 58.5 C

[56] References Cited

UNITED STATES PATENTS 3,628,135  12/1971  Reed .............................324/58.5 A

*Primary Examiner*—Robert J. Corcoran
*Attorney*—George C. Sullivan

[57] ABSTRACT

A microwave induction gage for inspecting a conductive workpiece such as conductive sheet material wherein microwave energy is fed to a gaging head having a conductive plate member coupling microwave energy onto the surface of the workpiece to be inspected. A waveguide window formed by the spacing between the conductive sheet material and a fin secured to said plate member and arranged transverse to the direction of energy propagation in the head area passes microwave energy, the amplitude of which varies as an exponential function of the spacing, whereby detection and measurement of the amplitude of the energy passing the window provides an indication of the magnitude of the spacing. The plate member is grooved to guide energy through the coupler head area. Also, a fin may be fitted longitudinally in the groove to aid mode stability.

By employing two of the conductive plate members, one on either side of the workpiece so as to form a pair of spaced energy paths, the amplitude of the energy passing the windows may be detected and multiplied to provide an indication of the thickness of the workpiece with inherent compensation for lateral displacement.

7 Claims, 6 Drawing Figures

INVENTOR.
PETER P. KEENAN

PATENTED JAN 9 1973　　3,710,243

INVENTOR.
PETER P. KEENAN
BY
George Sullivan
Agent

MICROWAVE GAGE FOR MONITORING THICKNESS OF A CONDUCTIVE WORKPIECE, FLAWS THEREIN OR DISPLACEMENT RELATIVE THERETO

BACKGROUND OF THE INVENTION

This invention relates generally to quality control and inspection equipment and more particularly to a microwave induction gage for flaw detection and for monitoring and determining displacement and/or thickness of a conductive workpiece such as in the production and fabrication of sheet metal and articles made of sheet metal.

The term "microwave" as used herein means electromagnetic energy waves whose frequencies are above about 300 megahertz.

Microwaves have characteristics which make them highly suitable for noncontacting flaw detection and dimensional or thickness measurement of metallics and other conductive materials. The penetration depth, for example, of microwave energy into metallics is so small (ordinarily less than $10^{-4}$ inches) that for practical purposes it may be ignored, and hence microwaves have the capability of exhibiting a universal response for all metallics. That is, microwaves have a capacity for being insensitive to metallic composition. Further, since microwaves are a radiated wave, they have the potential for noncontacting measurements.

Known prior attempts to employ microwave dimensional gaging have used signals reflected or bounced from the surface of the metal to determine thickness. Invariably, such gages have met with only limited success for one or more of the following reasons: (1) where single-bounce coupling is used, the gages exhibit poor sensitivity to thickness changes, (2) are markedly influenced by environmental effects such as oil, water, dirt or oxide film on the metal surface, or the dirty atmosphere, for example of a rolling mill, and (3) are sensitive to dimensional and component errors in the measuring equipment and thus involve critical equipment adjustments.

SUMMARY OF THE INVENTION

The gage of this invention uses surface-wave coupling to the workpiece with amplitude detection of the transmitted microwave energy. With the exception that the separation between gaging heads must be held to the dimensional accuracy required, the gage does not have critical dimensions, is substantially insensitive to component errors, and for industrial instrumentation is relatively simple and inexpensive to construct and maintain.

An object of this invention is to provide a microwave induction gage for flaw detection and/or accurately gaging the displacement or dimensions of a part during fabrication or machining whereby the dimensional data obtained may be reliably used for inspection or either manual or automatic machine control purposes.

Another object of this invention is to provide a microwave induction gage which can accommodate a wide variety of workpiece thicknesses from thousandths of an inch up to several feet, if desired.

Another object of this invention is to provide a microwave induction gage for flaw detection and/or thickness measurements which does not physically contact the workpiece and which is capable of inherently compensating for angular as well as lateral translational motions of the workpiece material up to about ± ¼ wavelength. Depending upon size and cost restrictions, the gage can be scaled over a broad band of microwave frequencies extending from below 3 GHz (gigahertz) to above 100 GHz. The lower limit is established only by the maximum allowable size of the gaging heads while the upper limit would be established by the availability and cost of the microwave components. Within such a broad wavelength band, a very flexible range of gaging characteristics can be achieved ranging from motion compensation approaching ± 1 inch at 3 GHz to line width resolution approaching 0.01 inch and thickness gaging accuracies approaching ± $10^{-5}$ inches at 100 GHz.

Still another object of this invention is to provide a microwave induction gage which is insensitive to metal composition and to oil, water, dirt, paint and oxide films on the metal surfaces. Because of high sensitivity to dimensional change, a dirty atmosphere has only a negligible effect on gage response. Experiments verify that the gage is capable of a wavelength-to-line width resolution exceeding 10 so that line width resolutions under 0.1 inch are achieved at X-band microwave frequencies. This ability to scan a line on the surface of the workpiece allows the gage to be used with very irregular two-dimensional workpiece profiles and is not limited to use with flat sheet material.

Further and other objects will become apparent from a reading of the following detail description, especially when considered together with the accompanying drawings wherein like numerals refer to like parts.

BRIEF DESCRIPTION OF THE DRAWINGS

FIG. 6 is a fragmentary view of an alternate type of mode transducer suitable for use in either or both the FIG. 1 or FIG. 4 gages.

DESCRIPTION OF THE PREFERRED EMBODIMENTS

Figure 1:
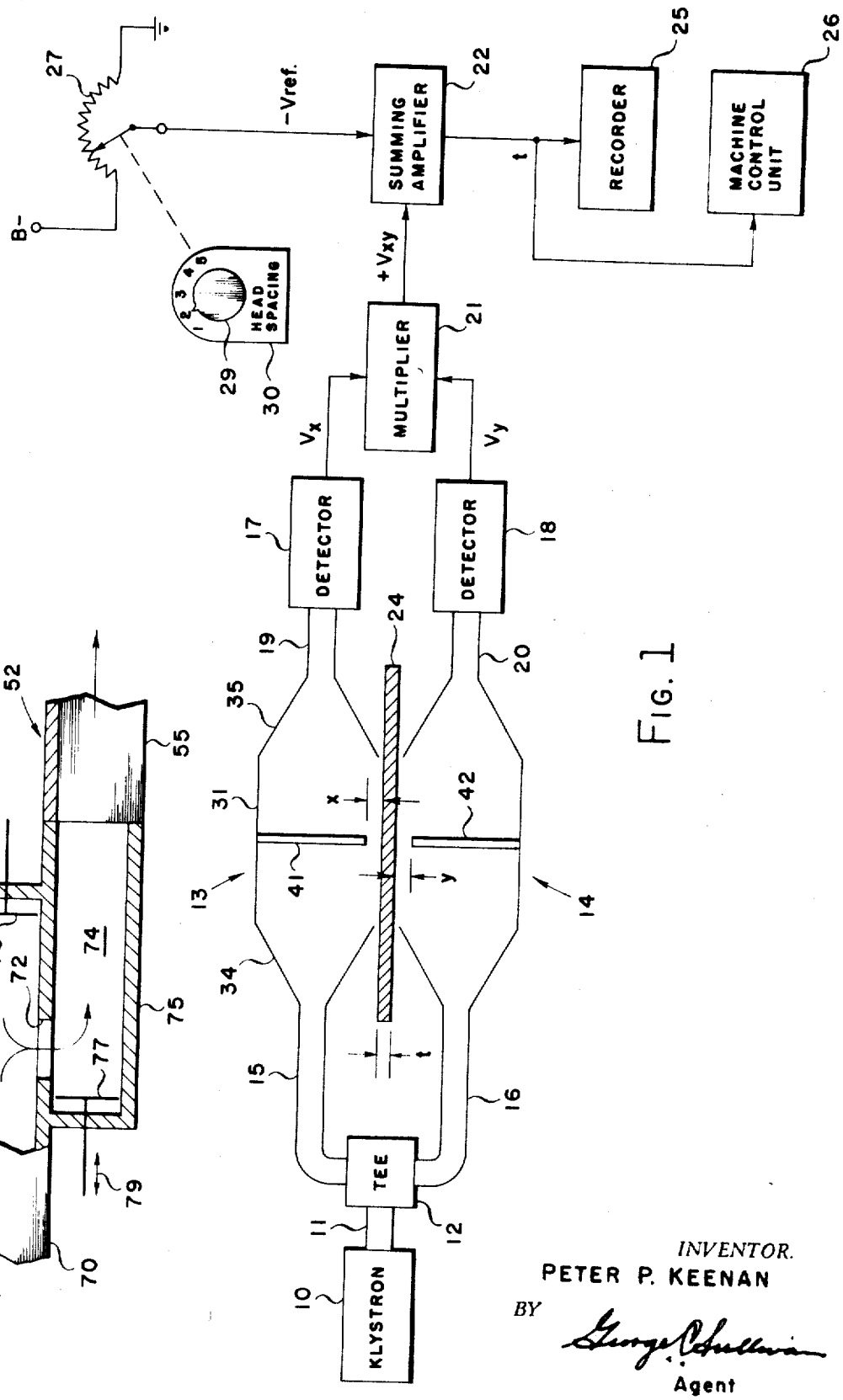
FIG. 1 is a block diagram schematic view of one form of the microwave induction gage configured for thickness measurements.

Referring to FIG. 1, a klystron 10 or other suitable microwave source supplies microwave energy through waveguide 11 to a tee 12 where the energy is divided to separately feed two spaced gaging heads 13 and 14 through waveguides 15 and 16, respectively. The outputs from gaging heads 15 and 16 are applied to microwave amplitude detectors 17 and 18, one for each head, through waveguide sections 19 and 20. Output signal, $V_x$, from detector 17 and output signal, $V_y$, from detector 18 are fed to multiplier 21 where the product, $V_{xy}$, of these two signals, $V_x$ and $V_y$, is obtained. A summing amplifier 22 receives $V_{xy}$ and a reference voltage, V ref., which voltage represents a particular gage setting, $b$, which is the physical spacing between gaging heads 13 and 14 as represented by the sum of $x + y + t$ in FIG. 1, where $t$ equals the thickness of workpiece 24. The difference voltage, $(x + y) - b$, is a measure of the thickness of the workpiece, and this thickness voltage output is typically applied to a suitable recorder 25 and/or machine control unit 26.

Reference voltage, V ref., is supplied to summing amplifier 22 by a suitable source of negative potential, B−, through potentiometer 27. Wiper 28 forming a part of potentiometer 27 is manually movable such as by control knob 29 on control panel 30 to indicate the selected spacing for gaging heads 13 and 14.

Figure 2:
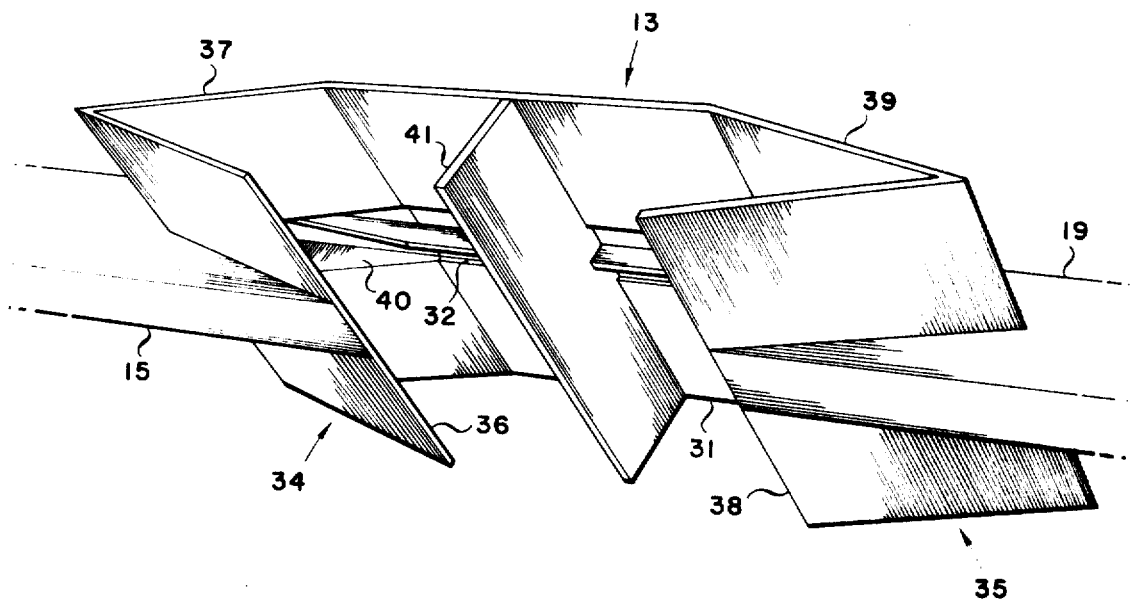
FIG. 2 is a perspective view showing in detail the gaging head and mode transducers in the FIG. 1 device.

The geometry for gaging head 13 is shown in FIG. 2, it being understood that both gaging heads 13 and 14 are symmetrically alike, but with parts reversed as to left and right. Basically, the gaging head cooperates with the workpiece to function in the test area as a parallel plate waveguide where the workpiece serves as one of the plates and plate member 31 of the gaging head functions as the other plate. A groove 32 is formed in plate member 31 to aid in confining the microwave energy propagated through the test area. The width of the groove is essentially the same as the narrow width of waveguide sections 15 and 19. The depth of groove 32 is not critical but would typically be of the order of 0.05 inch for microwave energy at $x$-band. To further confine the microwave energy along a path defined by groove 32 and to stabilize the mode with which the microwave energy is propagated through the gaging head, a longitudinal fin 33 is centered in groove 32.

Electromagnetic microwave energy can be propagated in a waveguide in a variety of modes. The so-called fundamental mode commonly used in radar is the $TE_{10}$ mode, which is normally propagated in a rectangular waveguide, such as waveguide 15 shown herein. The designation, $TE_{10}$, refers to an electromagnetic field configuration where the electric field vector is transverse to the direction of wave propagation; thus, transverse electric or TE. The subscript refers to the number of field variations in the transverse plane.

The gaging head cooperates with a workpiece to function as a modified form of parallel plate or "quasigroove" guide, which propagates the microwave energy as a variation or distorted version of the $TE_{10}$ mode. To be more specific, it exhibits a slight cross or horizontal polarization. To efficiently transmit the microwave energy from input waveguide 15, to gaging head 13, to output waveguide 19, it is desirable to employ mode transducers such as 34 and 35. These mode transducers shown in FIGS. 1 and 2 are of the tapered transition type with plates 36 and 37 and 38 and 39, respectively, which diverge towards the test area of gaging head 13. As best shown in FIG. 2, plate 37 contains a groove 40 which tapers in depth to mate with input waveguide 15 and with shallow groove 32 in gaging head plate member 31. Plate 39 is similarly constructed, while the groove formed in plates 36 and 38 may taper to zero depth at the mouth of the gaging head. It should also be noted that longitudinal fin 32 in plate member 31 preferably extends at least part of the way into mode transducers 34 and 35 to minimize leakage.

Both the gaging heads and mode transducers are made of a conductive material preferably metal, the same as waveguide sections 15 and 19, as necessary for propagation of microwave energy. Also, each gaging head includes a transverse fin 41, 42, which is arranged generally normal to the direction of wave propagation and secured in the gaging head, as best shown in FIG. 2. Each fin, such as fin 41 in gaging head 13, forms an inductive wave coupling window with the workpiece as indicated in FIG. 1, at a height, $x$. In gaging head 14, the coupling window height is designated $y$, and is formed by the spacing between fin 42 and the workpiece. These fins transverse to the direction of energy propagation effectively short circuit the electric field, which in the gaging head is directed generally parallel to the walls and concentrated in the center of groove 32. Thus, the energy coupled past the window in each case is essentially solely by magnetic fields, that is, via microwave currents on the conductive surfaces of the gaging head and workpiece. Thus, nonconducting or poorly conducting coatings such as oil, water, oxide, paint, paper, etc., on the conductive workpiece, which couple to the electromagnetic wave only through the electric field, have negligible effect on waveguide propagation or on the window coupling characteristics.

Penetration depth of the microwave currents on the surface of the conductive workpiece is less than $10^{-4}$ inches, allowing thickness gaging accuracies of this same order of magnitude to be achieved. The measurements are essentially independent of geometry of the workpiece and of metallic composition and presence of surface films.

The microwave currents flowing in the gaging head are primarily transverse with negligible longitudinal components. Thus, a transverse gap in the waveguide wall interrupts little or no current and, therefore, has negligible effect on wave propagation. This characteristic makes it unnecessary to provide good electrical coupling between the mode transducers and the workpiece, and between transverse fins 41, 42 and their associated grooved plate member such as 31 in gaging head 13.

Figure 3:
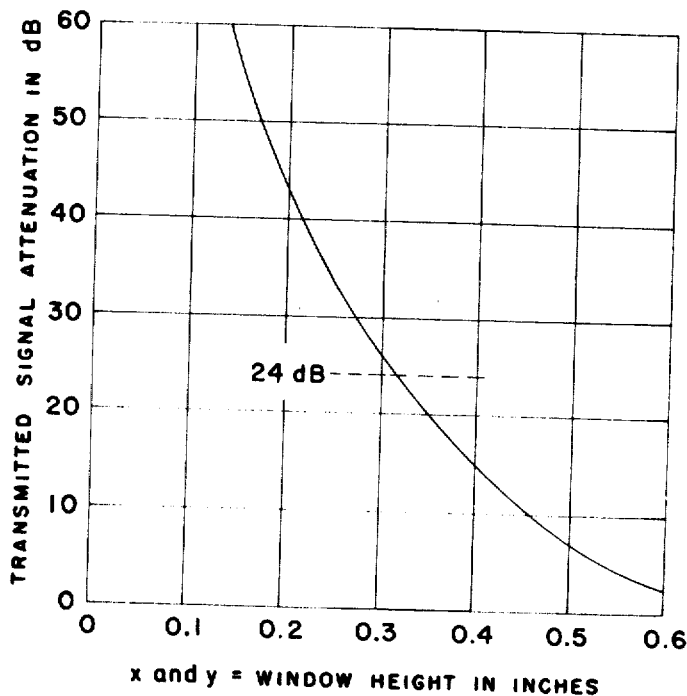
FIG. 3 is a chart showing the operating characteristics of the FIG. 1 gage.

In FIG. 3 is shown the coupling characteristics of the waveguide windows in terms of window height, $x$ and $y$, in inches versus signal attenuation in db (decibels). It will be observed on the chart that attenuation increases as the window height is reduced. Theoretically, the attenuation becomes infinite for zero window height. However, due to leakage, the attenuation would become infinite at some finite height below the practical operating range of the gaging device.

Still referring to FIG. 3, since db is proportional to the logarithim of the signal amplitude, a curve of constant slope would designate an exponential response. While the slope of the response curve 44 in FIG. 3 is nonlinear, it is close to linear over an appreciable range of window heights, particularly around the 24 db range in the example illustrated, corresponding to a window height of about 0.31 inch and providing a height range of at least ± 0.050 inch. This is quite adequate for most thickness and displacement gaging purposes to an accuracy of about ± 0.0005 inch.

The almost constant slope characteristics shown in FIG. 3 makes noncritical the setting of the window heights in the gaging heads on either side of the workpiece. Experimentally, an initial window setting of ± 0.005 inch was found sufficient at x-band for thickness measurement accuracies approaching ± 0.0003 inch with ± 0.020 inch motion. It is, of course, required that the separation between the metal fins remain stable to the dimensional accuracy required. The very relaxed tolerances make it possible to construct practical gages which operate at microwave frequencies as high as 50, 70 or even 100 GHz, permitting use of gaging heads of very small size which are capable of achieving thickness measurement accuracies approaching ± 0.00001 inch.

The steepness of the slope of curve 44 in FIG. 3 indicates the line width resolution of the gaging heads approaches the thickness of transverse fins 41 and 42, which may be of the order of 0.1 inch or less and is less by about a factor of 10 than the wavelength of the microwave energy transmitted through the gage. This high sensitivity of the coupled signal to the thickness of transverse fins 41 and 42 is characteristic of an inductive aperture, and it is this characteristic which makes possible the FIG. 4 modification for flaw detection of conductive workpieces. It should also be recognized that by employing only one gaging head such as 13 in FIG. 1, instead of two heads, one on either side of the workpiece, the output of detector 17 would represent displacement of the workpiece relative to the head and permit use of such device as a displacement gage.

Figure 4:
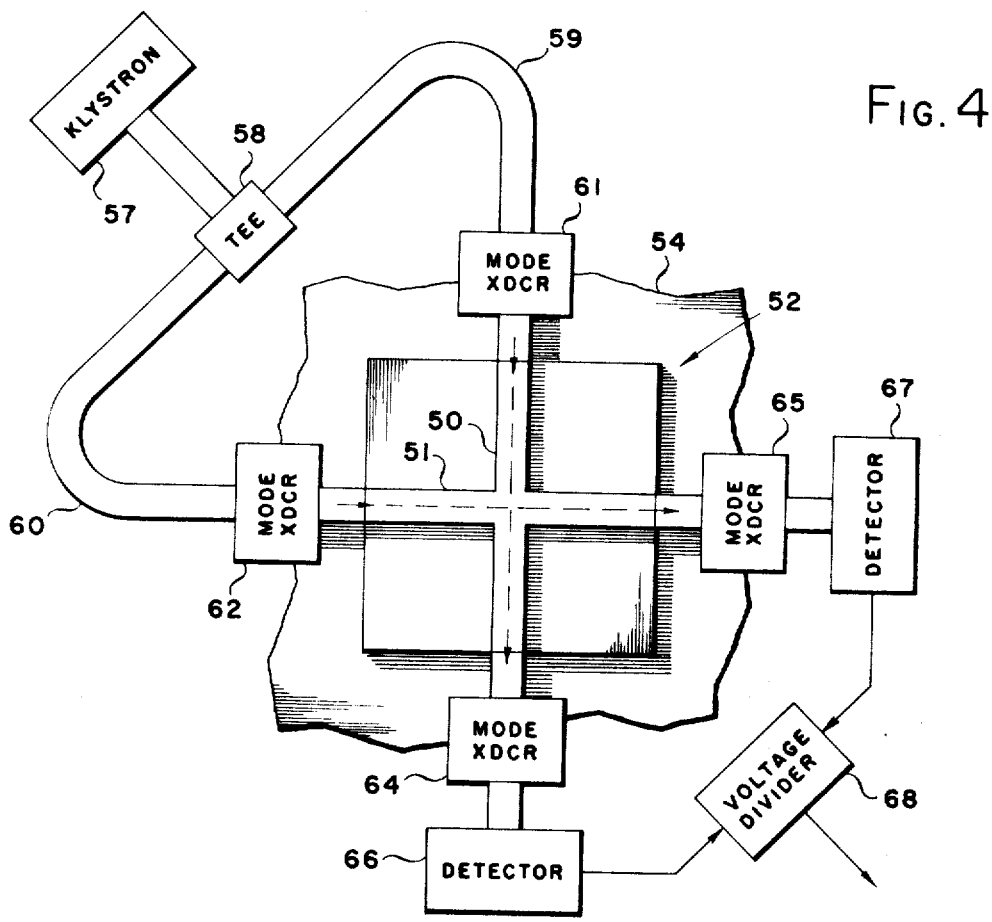
FIG. 4 is a block diagram schematic view of a modified form of microwave induction gage suitable for flaw detection.
Figure 5:
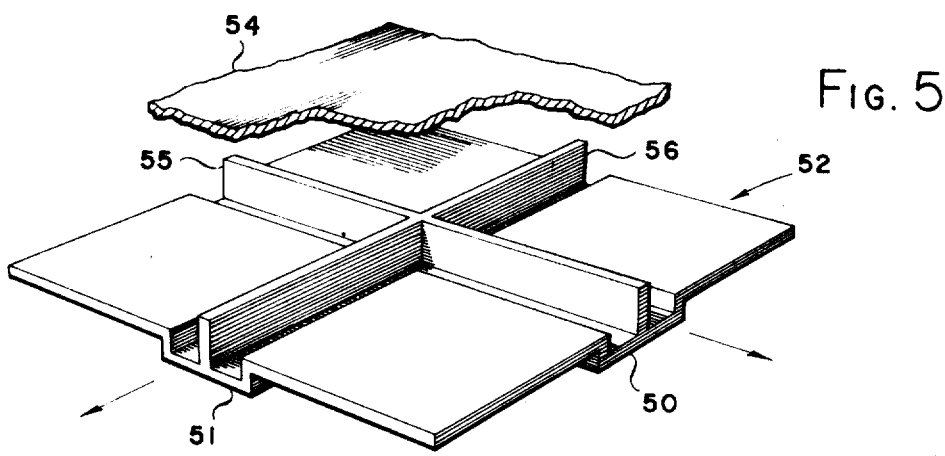
FIG. 5 is a perspective view showing in detail the gaging head in the FIG. 4 device.

By using two orthogonally disposed and intersecting waveguide grooves 50 and 51 in gaging head 52, both on the same side of workpiece 54, as shown in FIGS. 4 and 5, one can achieve a two dimensional spot size approaching the line width intersection of the gaging head. Such a gage is capable of detecting minute cracks and surface irregularities of the order of 0.1 inch long by $10^{-4}$ inches deep in a metal or similar conductive workpiece. Like the thickness gage shown in FIGS. 1 and 2, the flaw sensor will ignore poorly conducting coatings such as oil, water, oxide, paint, paper, etc., on the conductive workpiece.

Referring specifically to the flaw sensing device shown in FIGS. 4 and 5, waveguide grooves 50 and 51 have longitudinal fins 55 and 56 centered therein which intersect with each other and provide mode stability for the microwave energy transmitted through the two channels of the gaging head. Fins 55 and 56 further cooperate with the workpiece to form intersecting waveguide windows, each of which also functions as previously described for the transverse fin in the thickness gage of FIGS. 1 and 2 to pass only microwave currents through magnetic field coupling. These currents flow in the surface of the conductive workpiece at a depth not exceeding $10^{-4}$ inches at microwave frequencies. For example, the penetration depth in copper at 10 GHz, corresponding to a wavelength of about 3 centimeters, is $3 \times 10^{-5}$ inches and decreases with increasing frequency.

Still referring to FIGS. 4 and 5, microwave energy is supplied to gaging head 52 from Klystron 57 or other suitable source. Transmission of the energy is via tee 58 and waveguide sections 59 and 60 to mode transducers 61 and 62 which are each coupled to one of the two intersecting grooves in gaging head 52. It is the function of the mode transducers to efficiently transform the energy mode in the waveguide to that in the gaging head. Mode transducers 64 and 65 are similarly situated at the output end of the two grooves in gaging head 52. The microwave currents passing the intersecting waveguide windows in the two channels of the gaging head are separately applied to detectors 66 and 67 where the amplitude of the energy is read. The output of the two detectors are fed to a voltage divider 68 and the ratio between the two amplitudes obtained for flaw detection. When the magnitude of that ratio changes appreciably, it is an indication of the presence of a flaw or crack in the workpiece, and as indicated above, the sensitivity of the device is adequate to detect flaws no deeper than about $10^{-4}$ inches.

The use of voltage divider 68 in lieu of a multiplier as in the thickness gage of FIGS. 1 and 2, provides compensation for relative motion between the gaging head and workpiece. Where the two energy paths are on the same side rather than on opposite sides of the workpiece, a division rather than a multiplication function is required to be performed to provide motion compensation. By employing a pair of gaging heads like gaging head 52, one on either side of a workpiece as in the FIG. 1 arrangement, both flaw detection and thickness monitoring operations can be performed with the device of this invention.

Mode transducers 61, 62, 64 and 65 may be of the tapered transition type disclosed in connection with FIGS. 1 and 2, but a side wall hybrid type mode transducer such as shown in FIG. 6 could well be employed instead, particularly for feeding the FIG. 4 type gaging head. Referring to the FIG. 6 mode transducer, waveguide section 70, corresponding to waveguides 59 or 60 in FIG. 4, feeds microwave energy from input cavity 71 through aperture 72 and into output cavity 74 formed by a short section of waveguide 75 which connects directly with groove 50 or 51 in gaging head 52. Shorting plate 76 in cavity 71 and shorting plate 77 in cavity 74 are independently movable as indicated by arrows 78 and 79 to tune the transducer for achieving maximum energy transfer from cavity to cavity to gaging head 52.

In operating the several forms of the gaging device, microwave energy is applied to the gaging head where the conductive workpiece serves, in effect, as one wall of a modified parallel plate waveguide where the other wall is the grooved plate member of the gaging head. The fin located in the gaging head and arranged transverse to the direction of energy propagation forms an inductive coupling window with the workpiece, which effectively short circuits the electric field, passing only magnetic field currents. The amplitude of these microwave currents are a function of the height of the coupling window and they are detected and operated on to perform the desired gaging function such as thickness and flaw detection monitoring.

I claim:

1. A microwave induction gage for inspecting a conductive workpiece comprising: a source of microwave energy; at least one conductive plate member arranged in a generally spaced parallel relation to said conductive workpiece and forming waveguide head means coupled to said source for propagating microwave energy along the surface of said workpiece, said conductive plate member having a fin secured thereto and extending in the direction of said workpiece and transverse to the direction of propagation of said microwave energy so as to form a waveguide window wherein the electric field component of the microwave energy coupled through said window is essentially short circuited by said fin and wherein the magnetic field component of said microwave energy coupled through said window varies as a function of a workpiece parameter to be detected; and means for detecting the amplitude of said microwave energy coupled through said window to indicate the magnitude of said parameter.

2. A device as defined in claim 1 having two conductive plate members arranged one on either side of said conductive sheet material and forming a pair of microwave energy paths, means for separately detecting the energy level passing the waveguide window in each of said energy paths, and means for multiplying the detected energy levels and providing an output signal proportional to the thickness of said conductive sheet material.

3. A device as defined in claim 1 wherein said conductive plate member includes a waveguide groove formed therein for directing the propagation of microwave energy therealong.

4. A device as defined in claim 3 including a fin in said waveguide groove and extending longitudinally thereof for mode stabilizing said microwave energy.

5. A device as defined in claim 1 including waveguide transition means interposed between said source of microwave energy and said plate member for assuring the efficient transfer of energy from said source to said waveguide head means.

6. A device as defined in claim 1 wherein said head means includes a pair of orthogonally disposed intersecting grooves defining two microwave energy paths coupled to said source for propagating microwave energy along the surface of said workpiece, intersecting fins carried in said grooves and forming waveguide windows for passing microwave energy, detector means for separately detecting the amplitude of said microwave energy passing each said window, and divider means for obtaining the ratio of the signals at the output of said detector means for flaw sensing.

7. A device as defined in claim 6 having two said head means, one on either side of the workpiece, divider means for each said head means, and means for multiplying the output of said divider means for sensing the thickness of said workpiece.

* * * * *